(12) United States Patent
Moneyhun et al.

(10) Patent No.: US 12,503,931 B2
(45) Date of Patent: Dec. 23, 2025

(54) ZERO EMISSION BLOW DOWN SYSTEM AND METHOD

(71) Applicant: Moneyhun Equipment Sales & Services Co., Inc., Rock Springs, WY (US)

(72) Inventors: David H Moneyhun, Rock Springs, WY (US); John Moneyhun, Rock Springs, WY (US)

(73) Assignee: Moneyhun Equipment Sales & Services Co., Inc., Rock Springs, WY (US)

( * ) Notice: Subject to any disclaimer, the term of this patent is extended or adjusted under 35 U.S.C. 154(b) by 658 days.

(21) Appl. No.: 17/888,721

(22) Filed: Aug. 16, 2022

(65) Prior Publication Data
US 2024/0060396 A1 Feb. 22, 2024

(51) Int. Cl.
| | |
|---|---|
| *E21B 41/00* | (2006.01) |
| *B01D 53/86* | (2006.01) |
| *B01D 53/88* | (2006.01) |
| *E21B 36/00* | (2006.01) |
| *E21B 43/34* | (2006.01) |
| *E21B 43/40* | (2006.01) |

(52) U.S. Cl.
CPC ........ *E21B 41/0057* (2013.01); *B01D 53/864* (2013.01); *B01D 53/885* (2013.01); *E21B 36/008* (2013.01); *E21B 43/34* (2013.01); *E21B 43/40* (2013.01); *B01D 2257/702* (2013.01)

(58) Field of Classification Search
None
See application file for complete search history.

(56) References Cited

U.S. PATENT DOCUMENTS

| | | | |
|---|---|---|---|
| 2,245,028 | A | 6/1941 | Floyd |
| 4,779,677 | A | 10/1988 | Cobb |

(Continued)

FOREIGN PATENT DOCUMENTS

CA 2325966 A1 * 5/2002

OTHER PUBLICATIONS

CCSC Technology-Trailer Mounted Well Testing System. CCSC Technology. [online] [retrieved on Apr. 23, 2025]. p. 1. www.ccsctech.com/all-products-services/Trailer-mounted-well-testing-system (Year: 2016).*

(Continued)

*Primary Examiner* — Jelitza M Perez
(74) *Attorney, Agent, or Firm* — Thorpe North & Western, LLP

(57) ABSTRACT

A zero emission blow down system with an initial, high-capacity, mobile and removable platform can be positioned at a well and coupled to a wellhead. The blow down system carries a separator and a bank of catalytic heaters to react with accumulated production gas to remove the production gas without venting to atmosphere so that the well can be serviced. The blow down system can be removed from the wellhead and a subsequent, low-capacity fugitive gas remediation system can be positioned at the well and coupled to the wellhead. The fugitive gas remediation system can eliminate fugitive casing gas produced from the casing head of the well during operation. The fugitive gas remediation system has an enclosure with a separator and a catalytic heater to react with the casing gas and/or production gas.

19 Claims, 11 Drawing Sheets

(56) References Cited

U.S. PATENT DOCUMENTS

| | | |
|---|---|---|
| 6,955,704 B1 | 10/2005 | Strahan |
| 7,484,385 B2 | 2/2009 | Patel et al. |
| 10,017,701 B2 | 7/2018 | Meyer |
| 10,150,081 B2 | 12/2018 | Nurkowski et al. |
| 10,322,397 B2 | 6/2019 | Visser et al. |
| 10,561,977 B2 | 2/2020 | Johannessen et al. |
| 11,319,217 B2 | 5/2022 | DiBenerdini et al. |
| 2007/0227186 A1 | 10/2007 | Alferov et al. |
| 2009/0031756 A1 | 2/2009 | Betting et al. |
| 2014/0174122 A1 | 6/2014 | Cooper et al. |
| 2017/0120191 A1 | 5/2017 | Nurkowski et al. |
| 2018/0127336 A1 | 5/2018 | Maldonado et al. |
| 2021/0002989 A1 | 1/2021 | Moneyhun et al. |
| 2021/0317378 A1 | 10/2021 | Moneyhun et al. |
| 2022/0134283 A1* | 5/2022 | Maldonado .......... B01D 5/0051 422/168 |
| 2022/0228079 A1 | 7/2022 | Meyer |
| 2022/0228803 A1 | 7/2022 | Meyer |

OTHER PUBLICATIONS

CCSC Technology-Trailer Mounted Well Testing System, 2017, http://www.ccsctech.com/all-products-services/Trailer-mounted-well-testing-system?btwaf=27544517, retrieved Jul. 18, 2024, 2 pages.
"NGL PRO Flare Reduction, NGL Recovery and Gas Conditioning," Aspen Engineering Services, LLC, 23 pgs. (published Mar. 21, 2018) https://documents.pub/document/ngl-pro-flare-reduction-ngl-recovery-and-gas-c-pro-flare-reduction-ngl-recovery.html?page=1.

* cited by examiner

ZERO EMISSION BLOW DOWN SYSTEM AND METHOD

RELATED APPLICATION(S)

This is related to U.S. patent application Ser. No. 17/204,026, filed Mar. 17, 2021, which claims priority to U.S. Provisional Patent Application Ser. No. 62/991,187, filed Mar. 18, 2020, which are hereby incorporated herein by reference.

BACKGROUND

The present invention relates to a system and method for zero emission blow down of a well or production system. Oil and gas wells can develop a gas cap caused by gas percolating through the fluid column in the wellbore. It is sometimes necessary to blow down the well, or remove or vent the production gas from the well or production system, before starting well maintenance work. This production gas can have greater volume than casing gas. It can be desirable to remediate the production gas and prevent the production gas from venting to the atmosphere for environmental reasons.

In addition, it can be desirable to subsequently remediate lower volume production gas and/or casing gas produced from the casing head of the oil well, or so-called casinghead or Bradenhead gas. In oil and gas wells, low-pressure and low-volume casing gas (fugitive gas emissions) can leak up between the casing and the cement of the well. In the past, this casing gas has been blown back down the well, escaped to the atmosphere, or been flared-off. Some states have increased regulatory requirements for, and many companies have specified, a safe, clean and efficient means of managing Bradenhead pressures and the ensuing fugitive gas emissions. Some states mandate that the gas pressure cannot exceed 50 psi to resist contaminating ground water.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
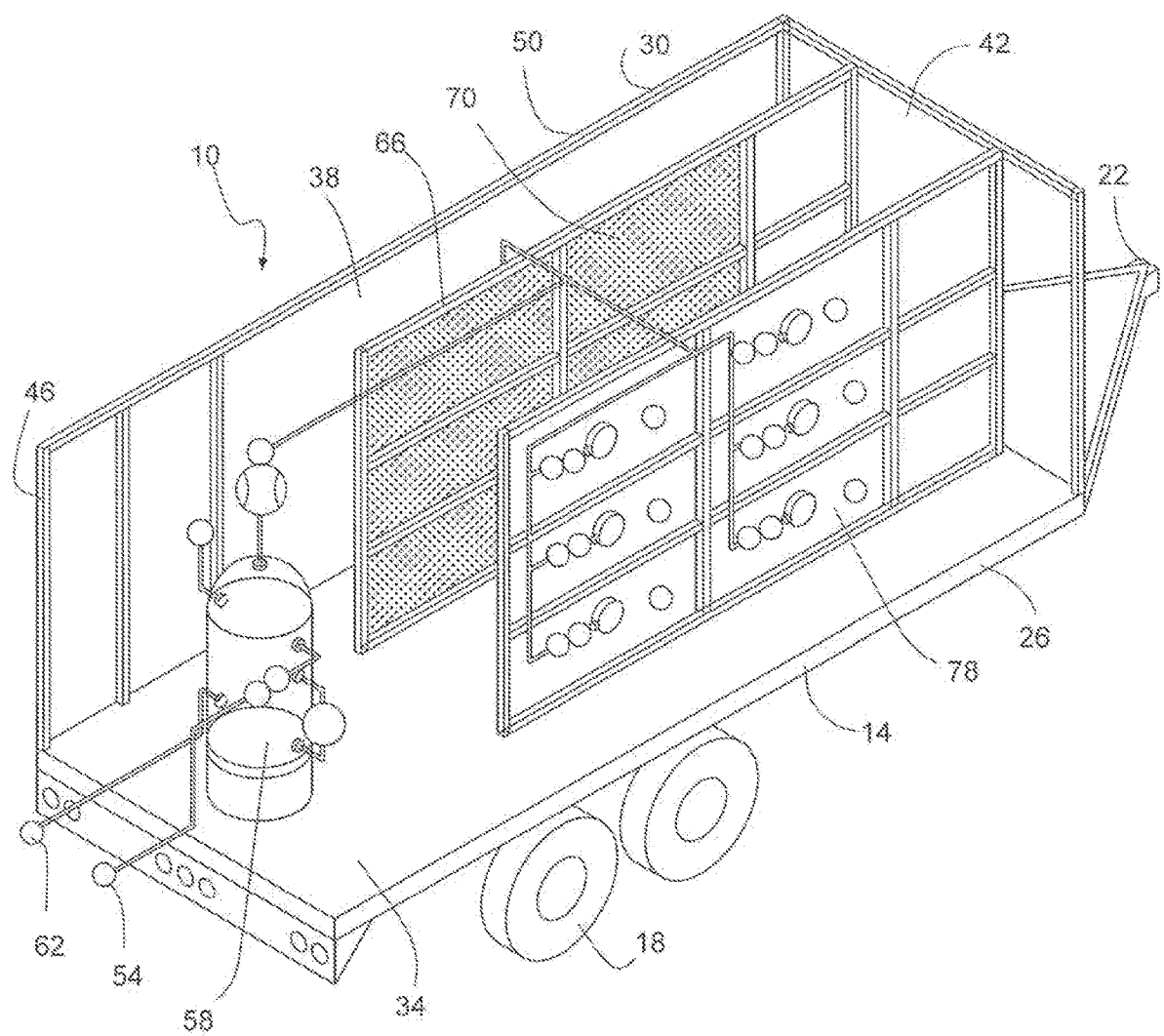
FIG. 1 is a partial perspective view of a zero emission blow down system and unit in accordance with an embodiment, shown with some walls and the ceiling of an enclosure and a trailer removed for visibility.
Figure 2:
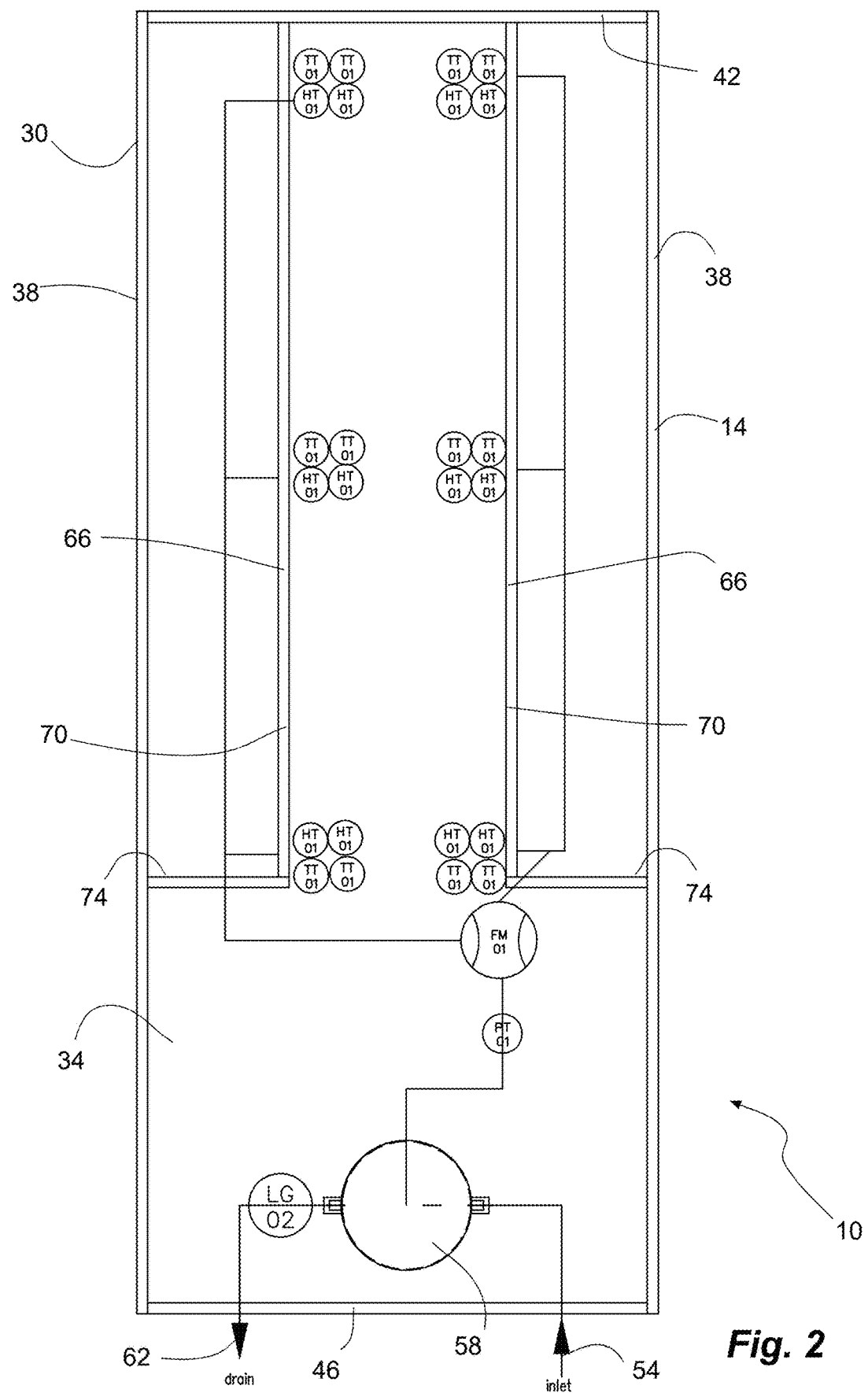
FIG. 2 is a partial top schematic view of the zero emission blow down system and unit of FIG. 1, shown with the ceiling removed for visibility.
Figure 3:
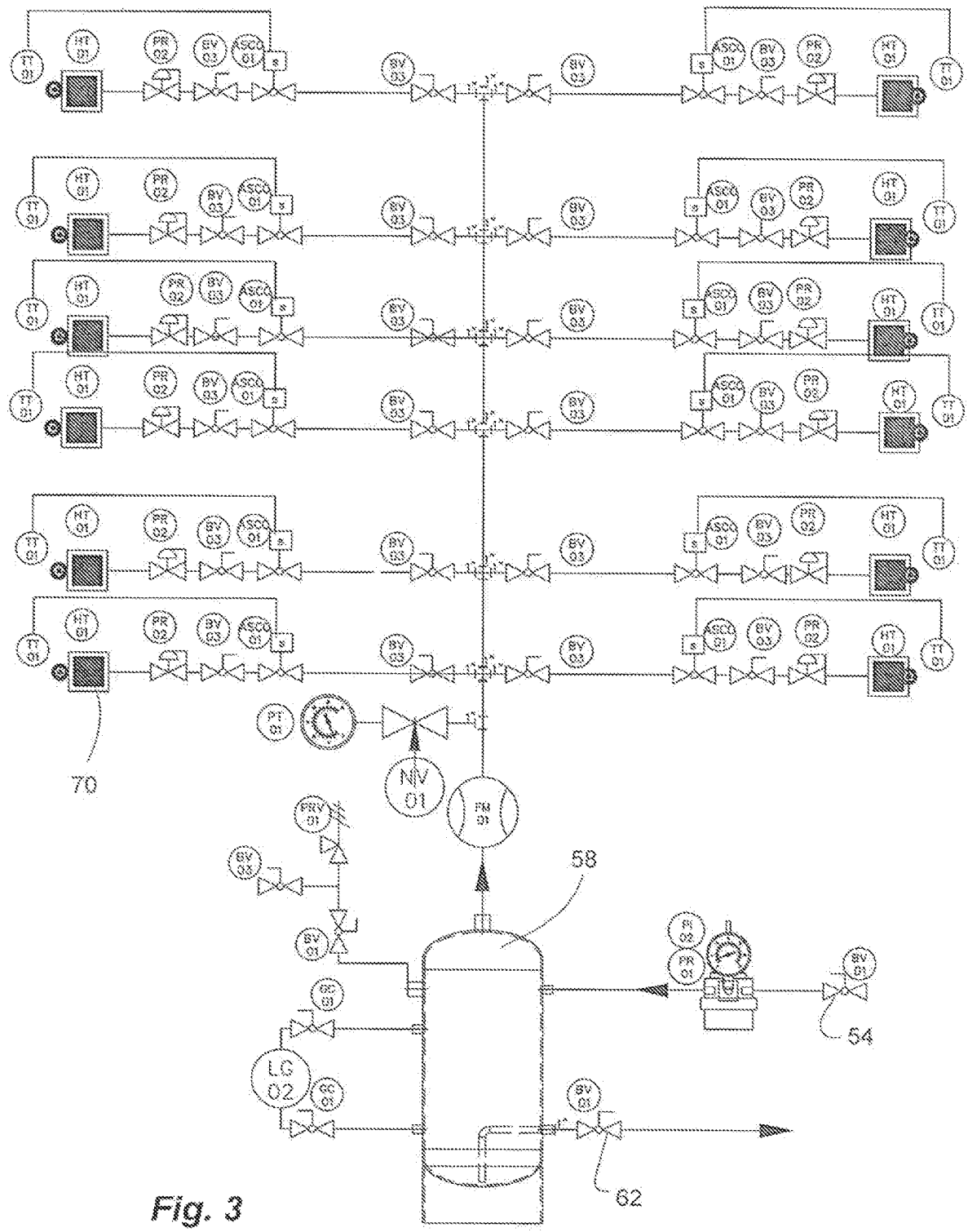
FIG. 3 is a schematic pipe diagram of the zero emission blow down system and unit of FIG. 1.
Figure 4:
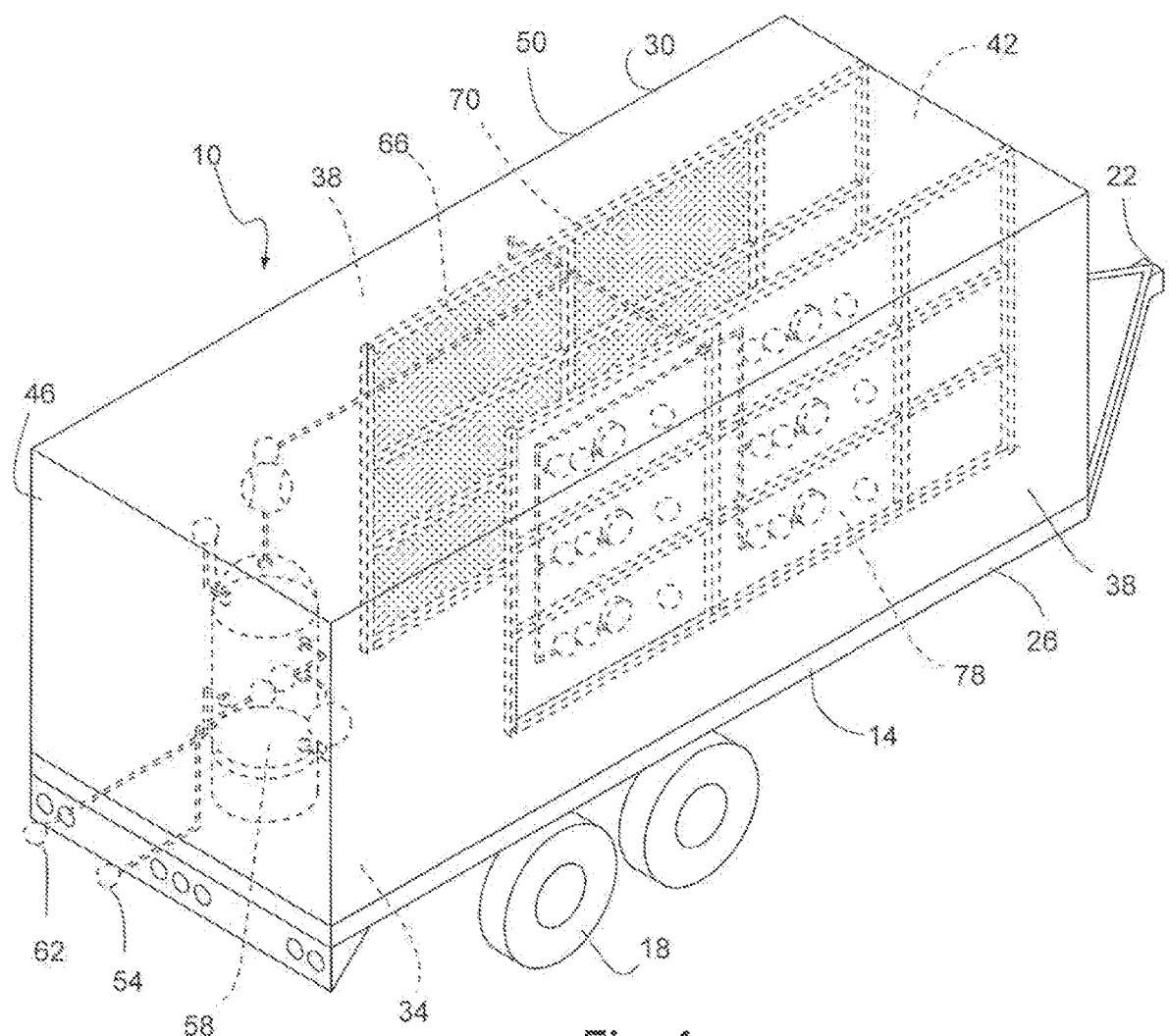
FIG. 4 is a perspective view of the zero emission blow down system and unit of FIG. 1.
Figure 5:
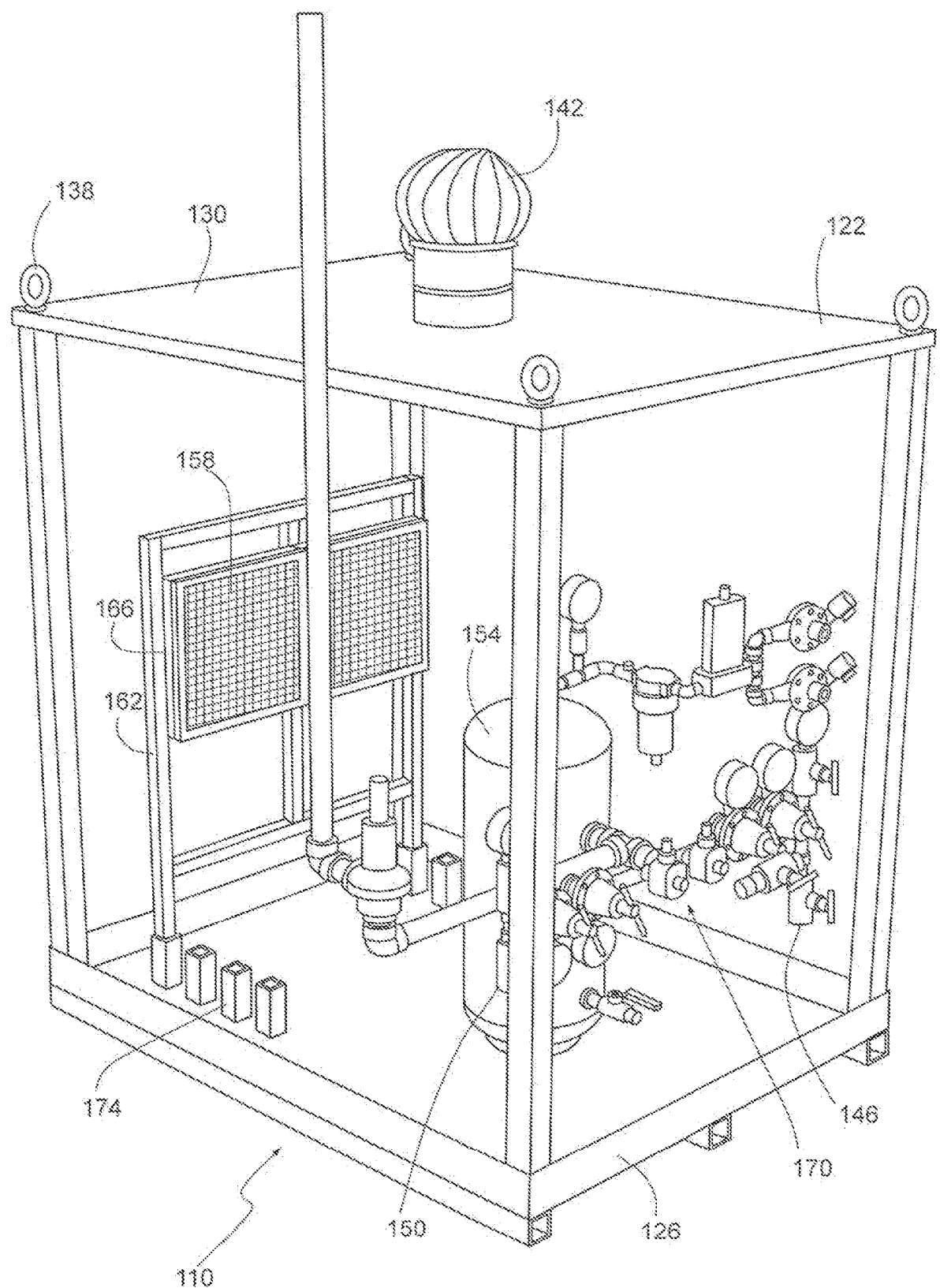
FIG. 5 is a perspective view of a fugitive gas remediation (FGR) system and unit in accordance with one embodiment, shown with walls of a skid removed for visibility.
Figure 6:
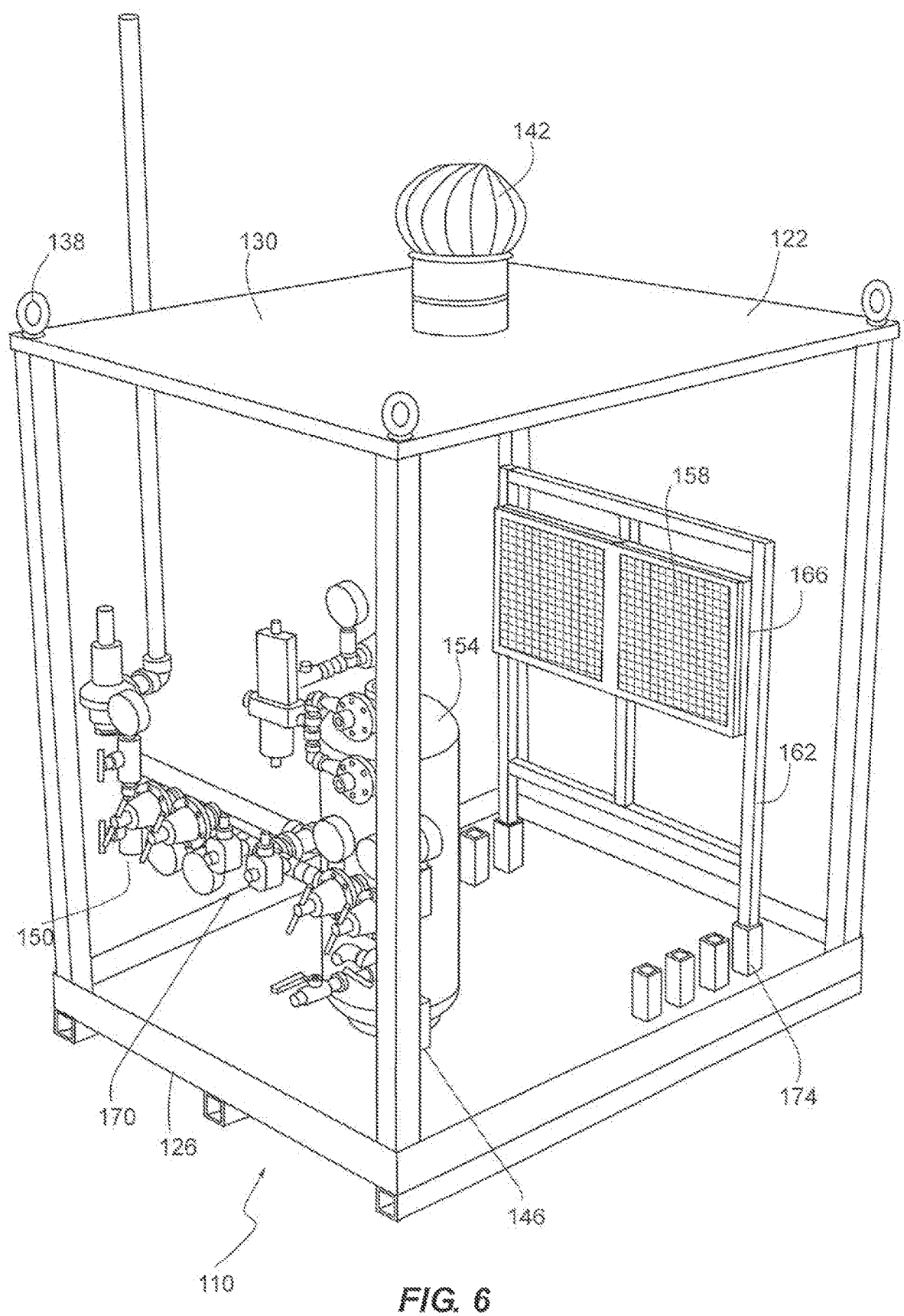
FIG. 6 is a perspective view of the FGR system of FIG. 5, again shown with the walls of the skid removed for visibility.
Figure 7:
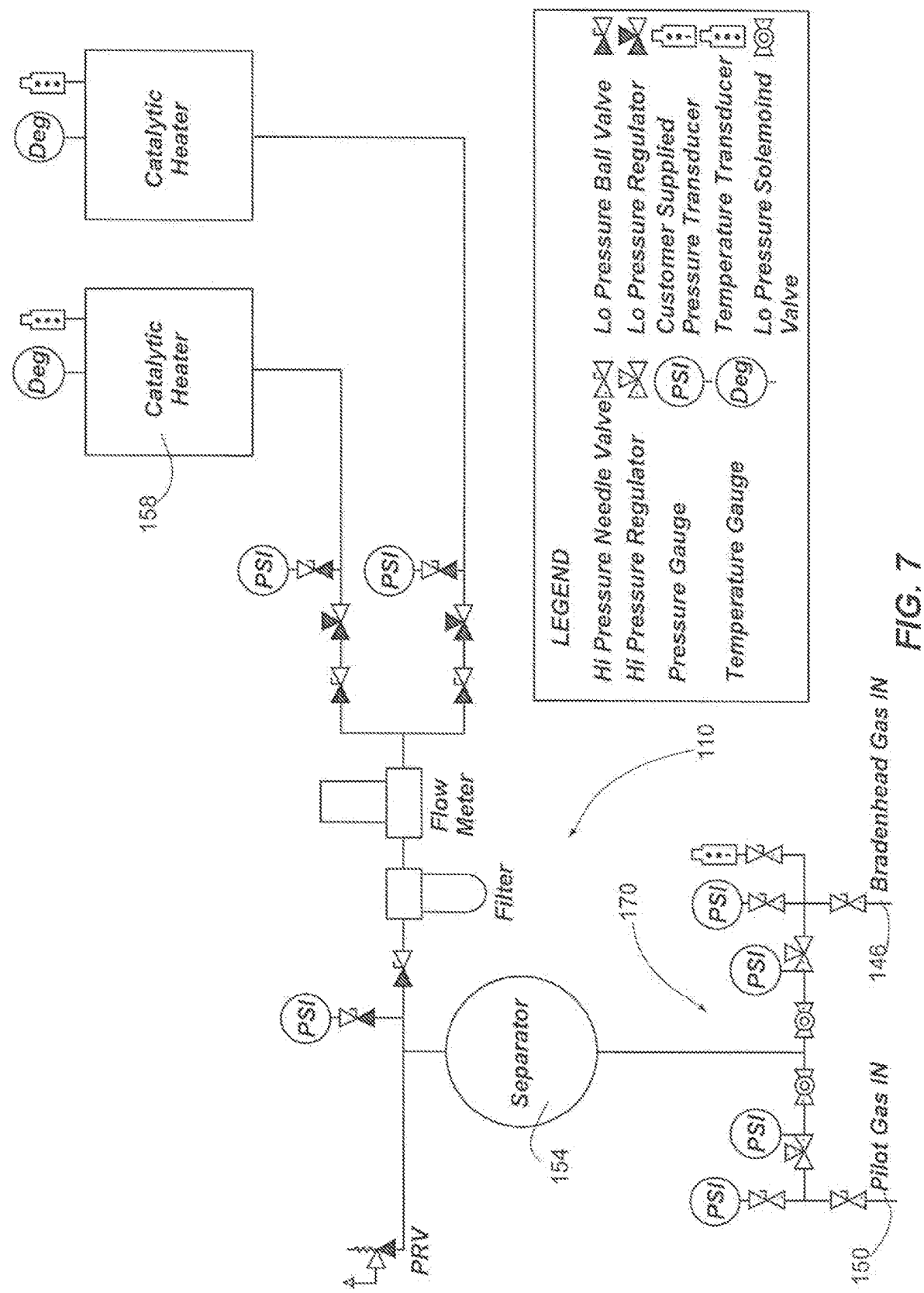
FIG. 7 is a schematic pipe diagram of the FGR system of FIG. 5.

Reference will now be made to the exemplary embodiments illustrated, and specific language will be used herein to describe the same. It will nevertheless be understood that no limitation of the scope of the invention is thereby intended.

DETAILED DESCRIPTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The invention presents a system and method to both blow down an oil and/or gas well for service and maintain the well during its operational lifetime. The well may accumulate a large volume of production gas or a gas cap. This production gas can percolate through the fluid column in the wellbore. In the past, this production gas may have been vented to atmosphere in order to allow the well be serviced. In addition, the well can also produce a smaller volume of production gas during service and/or operation, as well as fugitive casing gas while the well is operating at pressure. This casinghead gas or Bradenhead gas can be produced in the casing head of the well. This low-pressure and low-volume gas can leak up between the casing and the cement of the well. In the past, this casing gas has been blown back down the well, vented to atmosphere, or flared-off. Regulatory and/or company requirements may specify a safe, clean and/or efficient means of handling gas pressure and emissions to resist atmosphere and ground water contamination.

The system and method both blow down the well and maintain well operation without venting the production or casing gas to atmosphere (i.e. zero emission). In addition, the system and method can handle the large volume of accumulated production gas during blow down of the well for service, and the lower volume of production gas during service and/or operation, as well as the lower volume of fugitive casing gas during operation. Furthermore, the system and method can also eliminate or destroy emissions to the atmosphere while maintaining Bradenhead pressure within company required and state mandated limits.

The system and method can have a zero emission blow down system or unit with an initial, high-capacity, mobile and removable platform or trailer that can be positioned at a well and coupled to a wellhead. The blow down system carries a separator and a bank of catalytic heaters to react with accumulated casing gas to remove the accumulated production gas without venting to atmosphere so that the well can be serviced. The blow down system can be removed from the wellhead and a subsequent, low-capacity fugitive gas remediation (FGR) system can be positioned at the well and coupled to the wellhead. The fugitive gas remediation system can eliminate low volume production gas during service and/or low volume fugitive casing gas produced from the casing head of the well during subsequent operation. The fugitive gas remediation system has an enclosure with a separator and a catalytic heater to react with the production gas and/or the casing vent. The fugitive gas remediation system can remain with the well during the lifetime of the well.

Both the blow down system and the FGR system can eliminate production gas from the wellhead. The blow down system can rapidly destroy a large volume of accumulated production gas accumulated in the well, while the FGR system can destroy a smaller volume of production gas in real time during service and/or operation. Both systems can destroy the gas without flaring or venting to atmosphere. The gas is reacted in a catalytic heater.

In addition, the FGR system and method can combine pressure management and fugitive casing gas destruction which eliminates undesirable methane emissions to the atmosphere, while maintaining Bradenhead pressure within specified limits. In another aspect, a pilot gas system can be employed to ensure constant operation in the event the Bradenhead gas pressure/flow falls too low to sustain a catalytic reaction. The FGR system can automatically shift from pilot gas to Bradenhead gas. In another aspect, a booster unit can be used in unison with a primary unit to provide additional capacity if the Bradenhead gas flow exceeds the capacity of the primary unit. The systems can be pressure rated at or above the wellhead pressure to contain, rather than release, pressure and gas flow.

Referring to FIGS. 1-4, a zero emission blow down system 10 or unit in accordance with one embodiment is shown to blow down a well, or remove and eliminate the accumulated production gas from the well. The system 10 comprises a mobile platform 14 with wheels 18 and a tow hitch 22, such as a trailer 26 that can be towed on a road. The mobile platform 14 and the trailer 26 can be removably positioned at or adjacent to the wellhead of the well. In one aspect, an enclosure 30 can be carried by the platform 14 so that the trailer 26 can be enclosed. The enclosure 30 can have a floor 34 formed by the platform 14, lateral side walls 38, a forward wall 42, a rearward wall 46 or rear doors, and a ceiling 50. The enclosure 30 can have vents to allow heat to escape and/or air (and oxygen) to enter.

The platform 14, the enclosure 30, and the trailer 26 can have a length greater than 13 feet in one aspect, and approximately 20 feet in another aspect. The platform 14, the enclosure 30 and the trailer 26 can have a width of approximately 7.5 feet. Thus, the platform 14, the enclosure 30 and the trailer 26 can have a footprint greater than 100 sqft in one aspect, and greater than 150 sqft in another aspect. In addition, the enclosure 30 can have a height of approximately 7 feet.

The system 10, the unit, the platform 14, the trailer 26 and/or the enclosure 30 has an inlet 54 carried by the platform 14 and the trailer 26. The inlet 54 can be coupled to the wellhead, such as a valve of the wellhead, to receive the accumulated production gas. In one aspect, the inlet 54 can be accessed by opening the rear doors of the enclosure 30 and the trailer 26. Thus, the rear doors can close the inlet 54, or access to the inlet 54. In another aspect, the inlet 54 can be accessed through the rear doors or the walls 46 or 38 of the enclosure 30 and the trailer 26.

In one aspect, at least one scrubber or separator 58 can be carried by the platform 14 and located in the enclosure 30. The separator 58 is coupled to the inlet 54 to remove liquid from the accumulated production gas. The liquid can be stored for subsequent removal. In one aspect, the system 10 and the separator 58 can have an outlet 62 or drain. In one aspect, the separator 58 can be positioned towards a rear of the trailer 26, farther from the tow hitch 22 of the platform 30 or the trailer 26, and closer to the rear wall 46 or the rear doors of the trailer 26 to facilitate removal of the liquids from the separator 58. In one aspect, the separator 58 can be an initial, larger, higher-capacity separator 58 capable of handling a larger volume of production gas and removing a larger volume of liquid.

A bank 66 of catalytic heaters 70 is located in the enclosure 30 and coupled to the separator 58 to receive dry production gas. The catalytic heaters 70 react with the accumulated production gas to burn the accumulated production gas and produce heat in the enclosure 30 and the trailer 26. The catalytic heaters 70 can heat to over 300 degrees Fahrenheit to initiate a chemical reaction that destroys the accumulated production gas. In one aspect, the bank 66 of catalytic heaters 70 can be positioned closer to the tow hitch 22 of the platform 14 and the trailer 26, and away from the rear wall 46 or the rear door of the trailer 26.

The bank 66 of catalytic heaters 70 can comprise multiple individual catalytic heaters 70 or panels coupled together to form the bank 66. The bank 66 of catalytic heaters 70 can be arranged linear or straight, with the heaters 70 or panels of each bank 66 oriented parallel and co-planar with respect to one another. The bank 66 of catalytic heaters 70 can be oriented parallel with the length of the trailer 26, while the catalytic heaters 70 can be oriented to face laterally. The bank 66 of catalytic heaters 70 can be spaced-apart from the lateral walls 38 of the enclosure 30 and the trailer 26 for safety, in one aspect, the bank 66 of catalytic heaters 70 can extend at least half of the length of the enclosure 30 for efficient use of space and maximum use of the catalytic heater 70 surface area. In one aspect, the bank 66 can have a length of approximately 10.5 ft. In another aspect, the bank 66 of catalytic heaters 70 can extend from the floor 34 to the ceiling 50 of the enclosure 30. In another aspect, the bank 66 of catalytic heaters 70 can extend a majority of the height of the enclosure 30. In one aspect, the bank 66 of catalytic heaters 70 can be anchored to a wall, such as the front wall 42, of the enclosure 30. A stand-off 74 can be coupled between the bank 66 of catalytic heaters 70 and the wall 42 of the enclosure 30 with the catalytic heaters 70 spaced-apart from the walls 42 and 38 of the enclosure 30. The stand-off 74 can secure the bank 66 to the wall 42 while separating the heaters 70 from the wall 42 for safety. In another aspect, the catalytic heaters 70 can have a surface area greater than approximately 70 sqft. Thus, the enclosure 30 and the trailer 26 can be configured with the catalytic heaters 70 to maximize useful surface area of the heaters 70, efficiently utilize space, and provide a safe distance between a hot surface of the heaters 70 and the walls 38 and 42.

In one aspect, the blow down system 10 can have at least two separate banks 66 of catalytic heaters 70, as shown. The two banks 66 can be positioned spaced-apart from one another and oriented with the catalytic heaters 70 of each bank 66 facing one another and away from the lateral sides 38 of the enclosure 30 for safety. Thus, each bank 66 can shield a proximate wall 38 of the enclosure 30 or the trailer 26 from the heat of the other bank 66 of catalytic heaters 70. In one aspect, the at least two banks 66 can be coupled to the separator 58 in parallel for efficient operation. In another aspect, the at least two banks 66 of catalytic heaters 70 can be positioned spaced-apart from lateral walls 38 of the enclosure 30. In another aspect, the at least two banks can have catalytic heaters 70 with a surface area greater than approximately 140 sqft.

In one aspect, each bank 66 of catalytic heaters 70 can comprise at least two stacks 78 of catalytic heaters 70 arranged in a vertical column. The at least two stacks 78 can also be coupled in parallel for efficient operation. The at least two stacks 78 can be oriented parallel and coplanar with one another for efficient use of space in the enclosure 30.

The catalytic heaters 70 can be coupled to the separator 58 with a piping system to transport the casing gas from the separator 58 to the heaters 70. Each heater 70 can have a heat regulator valve coupled to the pipe system to control the feed of production gas to the heater, and a temperature sensor coupled to the heat regulator valve and transmitter to sense a temperature of the heater. The heat regulator valve can have a solenoid coupled to the temperature sensor. In addition, each heater 70 can have a valve to control operation of the heater 70. For example, the valves can be used to turn off select individual heaters 70. A flow meter can be coupled to the piping system between the separator 58 and the heaters 70.

As described above, the system and method can utilize both the blow down system/unit 10 and the FGR system/unit 110 or 210 (described below). The blow down system 10 can be an initial, larger unit, while the FGR system 110 or 210 can be a subsequent, smaller unit. The blow down unit 10 can have a larger size (e.g. footprint greater than 100 sqft) and a greater gas volume capacity (e.g. catalytic heaters with greater than 70 or 140 sqft) with respect to a smaller size (e.g. foot print less than 50 sqft) and a lesser gas volume capacity (e.g. catalytic heaters with less than 9 sqft) of the FGR unit 110 or 210. In one aspect, the blow down system 10 can have a capacity that is an order of magnitude greater than a capacity of the FGR unit 110.

A method of blowing down and remediating a well utilizes the blow down system 10 and the FGR system 110 or 210 described herein. The method comprises positioning the blow down unit 10 at the well or wellhead and coupling the inlet 54 of the blow down unit 10 to the wellhead. Accumulated production gas from the well is received and reacted with the bank 66 of catalytic heaters 70 of the blow down unit 10. The well can be serviced. The blow down unit 10 can be removed from the wellhead and the well. The fugitive gas remediation unit 110 or 210 is positioned at the wellhead and the inlet 146 of the fugitive gas remediation unit 110 is coupled to the wellhead. The well is continued to be serviced and/or operated. A lower volume of production gas and/or the fugitive casing gas from the wellhead is received and reacted with the catalytic heater 158 of the fugitive gas remediation unit 110 or 210 while the well is serviced and/or operated. Thus, the FGR unit 110 or 210 can be used to remediate a smaller volume of production gas from the well, or the casing gas from the well, or both.

Referring to FIGS. 5-9, a FGR system 110 in accordance with one embodiment is shown for eliminating fugitive gas, such as casing vent gas, or Bradenhead gas, from a wellhead during operation of the well. In addition, the FGR system 110 can eliminate a lower volume of production gas during continued servicing of the well and/or during operation of the well. The FGR system 110 can comprise an enclosure 118 (FIGS. 8 and 9) to be positioned at a well site adjacent the wellhead. In one aspect, the enclosure 118 can be substantially enclosed so as to form a majority enclosure. In another aspect, the enclosure 118 can form a super-majority enclosure. The enclosure 118 can have openings therein for piping, venting, and air intake.

Figure 8:
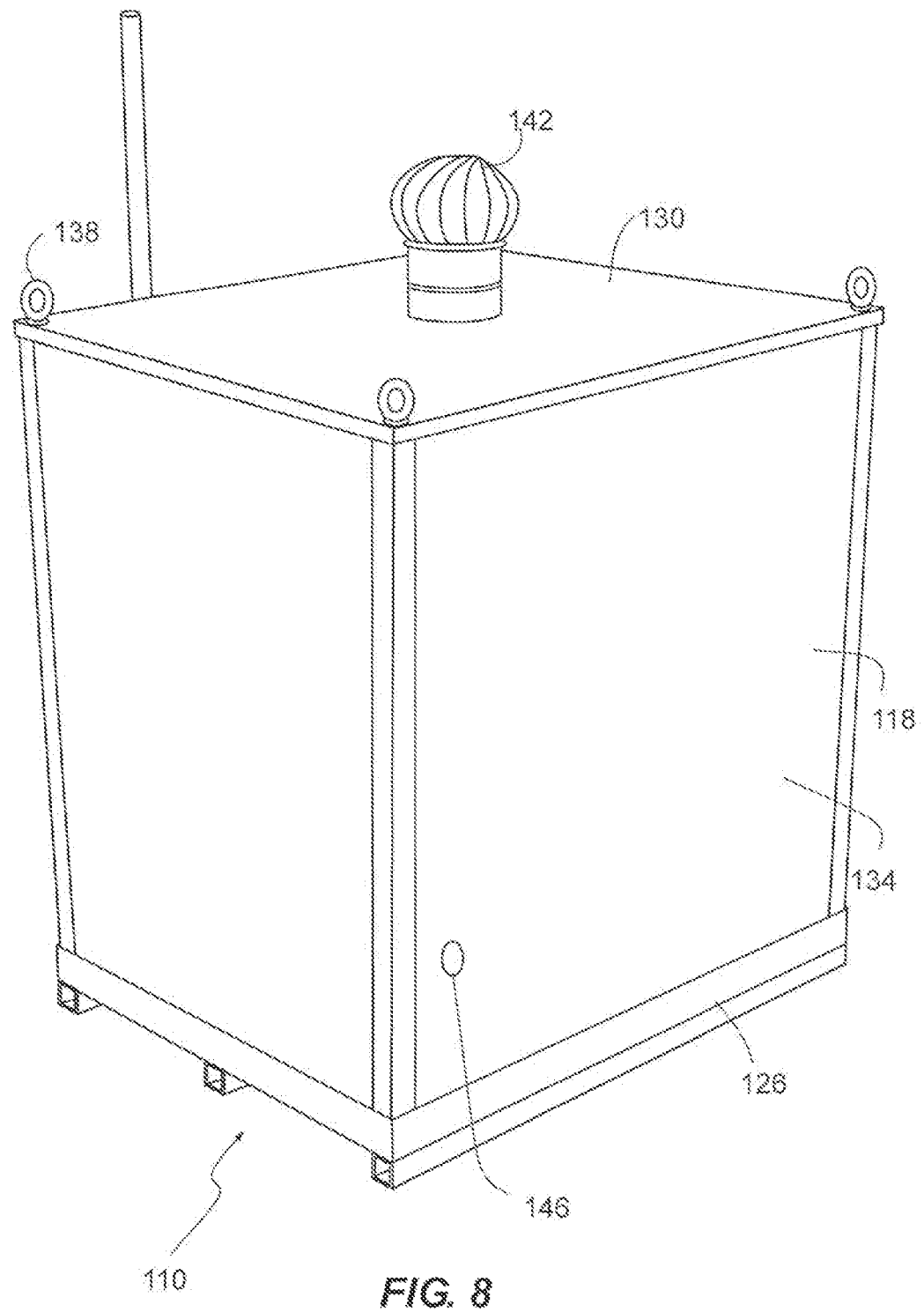
FIG. 8 is a perspective view of the FGR system of FIG. 5, shown with the wall on the skid forming an enclosure.
Figure 9:
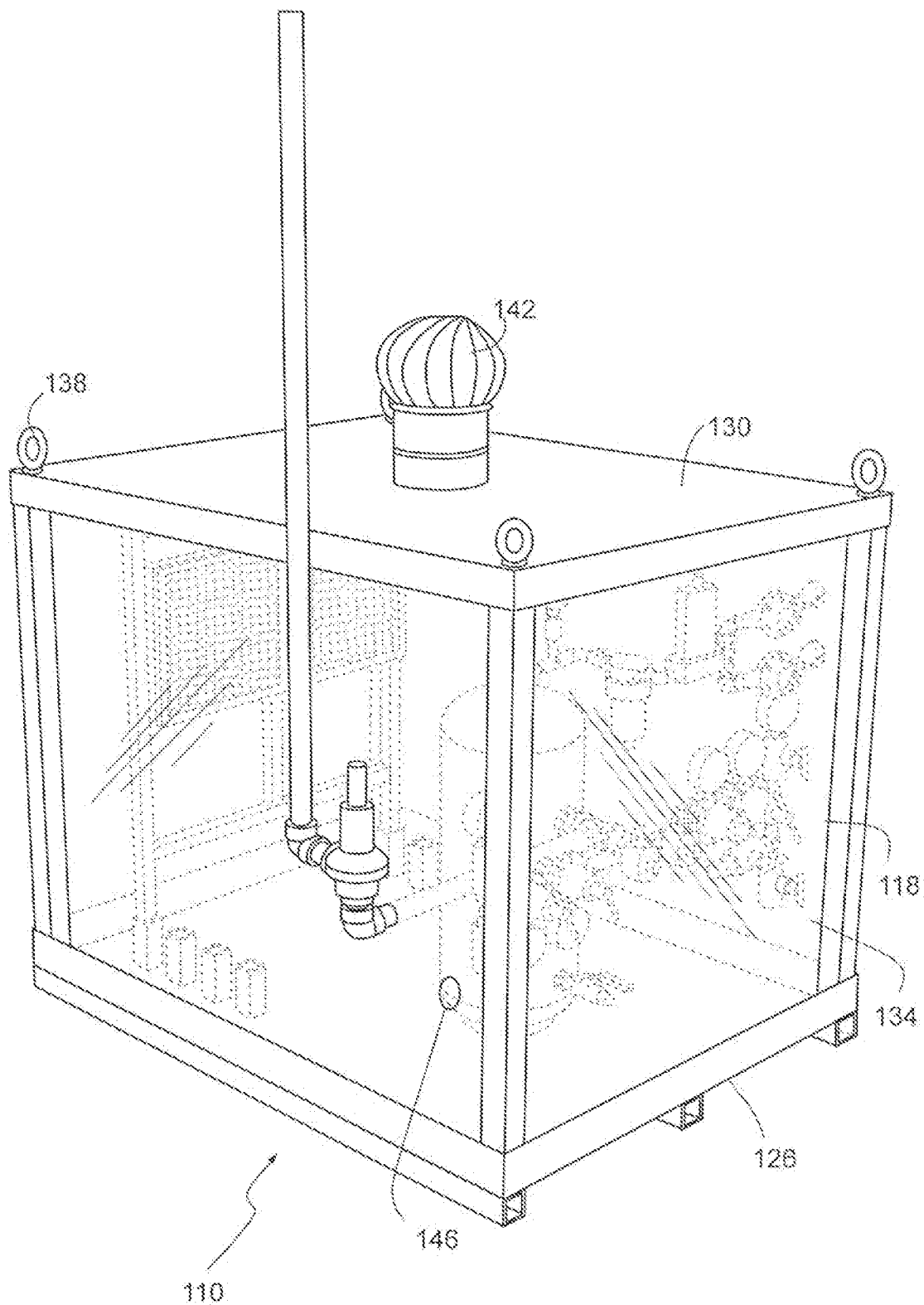
FIG. 9 is a perspective view of the FGR system of FIG. 5.
Figure 10:
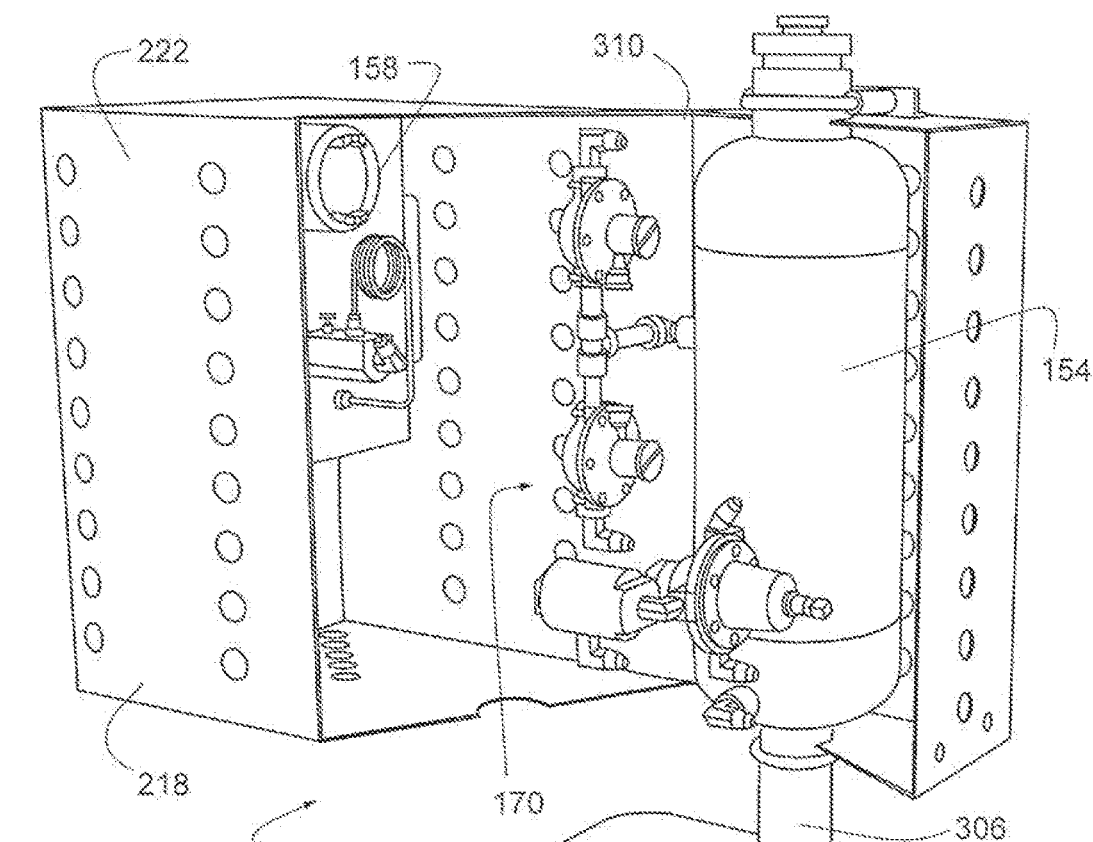
FIG. 10 is a perspective view of another FGR system in accordance with another embodiment, shown in an open configuration.
Figure 11:
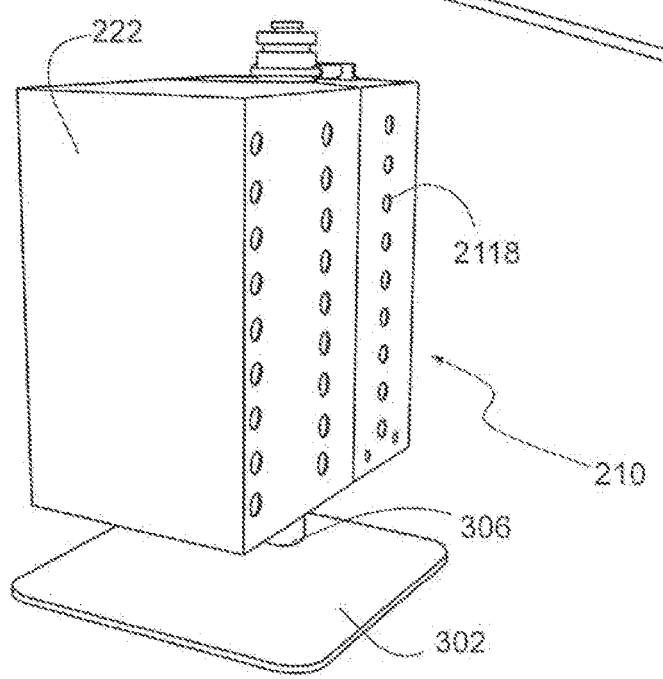
FIG. 11 is a perspective view of the FGR system of FIG. 10, shown in a closed configuration.
Figure 12:
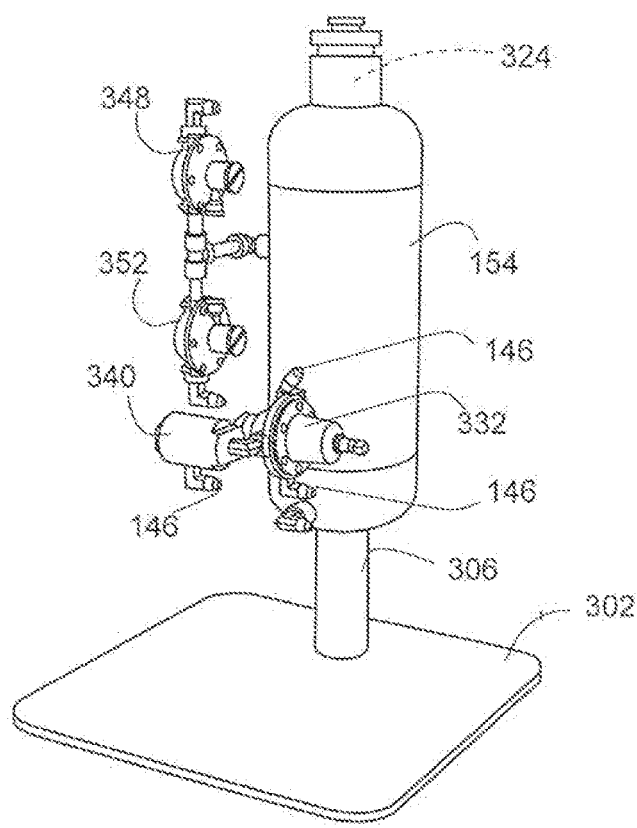
FIG. 12 is a partial perspective view of the FGR system of FIG. 10.
Figure 13:
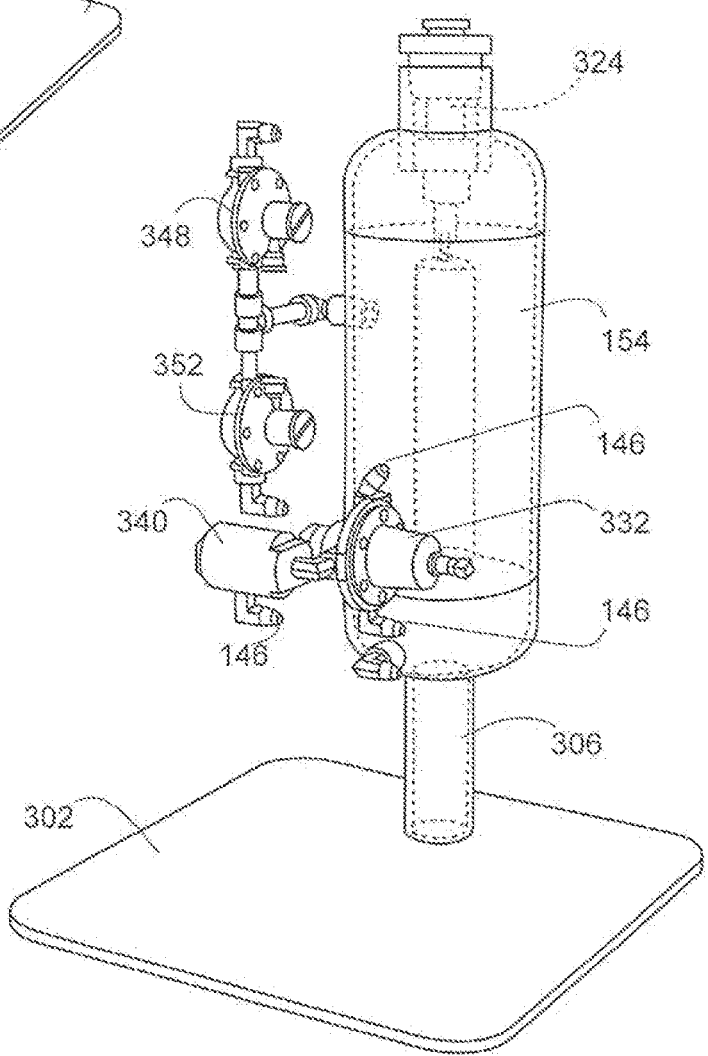
FIG. 13 is a partial perspective view of the FGR system of FIG. 10.

In one aspect, the FGR system 110 and the enclosure 118 can comprise a mobile skid 122 with a floor 126, a roof 130, and a perimeter wall 134 (FIG. 8). The floor 126 can be configured to be elevated and/or to have lower openings below the floor 126 to accommodate the forks of a forklift. In another aspect, the system 110, the enclosure 118 and the skid 122 can have eyelets 138 secured to a top thereof to allow the system 110, the enclosure 118 and the mobile skid 122 to be lifted with hooks, cables and a crane or loader. The system 110, the enclosure 118 and the skid 122 can be deliverable adjacent the wellhead, and can be located on the ground. In one aspect, the skid 122 can be sized relatively small to fit in existing wellhead sites. For example, the skid 122 can have a footprint less than 4×8 ft, or 32 sqft. In addition, the roof 130 can have a vent 142 to vent the enclosure 118. The vent 142 and/or other vents, such as in the walls 134, can allow heat to escape and/or air (and oxygen) to enter.

The enclosure 118 and the skid 122 can have and carry an inlet 146 to be coupled to a valve of the wellhead or a casing vent gas source. In one aspect, the enclosure 118 and the skid 122 can have and can carry a pilot gas inlet 150 to be coupled to a pilot gas source. The pilot gas inlet 150 allows pilot gas into a pilot gas system to ensure constant operation in the event the Bradenhead pressure and/or flow falls too low to sustain a catalytic reaction. Thus, the FGR system 110 avoids release of Bradenhead to the atmosphere. The FGR system 110 can shift from pilot gas to Bradenhead gas automatically.

A scrubber or separator 154 is located in the enclosure 118 and the skid 122 and coupled to the inlet 146. The separator 154 receives the fugitive gas or casing vent gas, and removes any liquid. The scrubber or separator 154 can remove liquid from the casing vent gas. The liquid can be stored for subsequent removal. In one aspect, the separator 154 can be positioned towards one side of the enclosure 118 and the skid 122.

A catalytic heater 158 is located in the enclosure 118 and the skid 122. The catalytic heater 158 is coupled to the separator 154 to receive dry fugitive casing gas and/or dry production gas. The catalytic heater 158 reacts with the casing/production gas to burn the gas and produce heat in the enclosure 118 and the skid 122. The catalytic heater 158 can heat to over 300 degrees Fahrenheit to initiate a chemical reaction that destroys the gas. In one aspect, the catalytic heater 158 can be positioned at another opposite side of the enclosure 118 and the skid 122, opposite the separator 154. The catalytic heater 158 can be oriented to face the separator 154 so that heat from the catalytic heater 158 is directed towards the separator 154.

In one aspect, a panel 162 can be positioned in the enclosure 118 and the skid 122. The panel 162 can have multiple bays 166. Each bay 166 can receive a catalytic heater 158. Thus, the FGR system 110 can have at least one catalytic heater 158. The multiple bays 166 allows the FGR system 110 to be configured with a desired number of catalytic heaters 158 to match a size of the wellhead and/or an anticipated flow of fugitive gas. The number of catalytic heaters 158 can be varied in accordance with the requirement of the site, or the amount of vent gas. In one aspect, the panel 162 can have two bays 166. In another aspect, the panel 162 can have four bays 166. In one aspect, the catalytic heaters 158 can be selectively operated to match the flow of fugitive gas. Pressure regulators and valves can be coupled to the pipe system 170 between the separator 154 and the catalytic heaters 158.

The FGR system 110 also has a pipe system 170 interconnecting the catalytic heater 158, the separator 154, the inlet 146, and the pilot gas inlet 150. The pipe system 170 includes valves (e.g. needle valves, ball valves and solenoid valves), gauges (e.g. pressure and temperature gauges), sensors (e.g. pressure and temperature transducer) and regulators. The pipe system 170 is located in the enclosure 118 and the skid 122. In one aspect, a majority of the pipe system 170 can be positioned at one side of the enclosure 118 and the skid 122, along with the separator 154, opposite the catalytic heater 158. In one aspect, the majority of the pipe system 170 can be greater than half of the pipe system. In another aspect, the majority of the pipe system 170 can be a super majority.

The enclosure 118 and the skid 122 can carry, surround and enclose the separator 154, the catalytic heater 158, and the pipe system 170. Thus, the catalytic heater 158 heats the separator 154 and the pipe system 170. The inlet 146 and the pilot gas inlet 150 can be coupled to the separator 154 and the catalytic heater 158. In one aspect, both the pilot gas and the fugitive gas can be directed to and through the separator 154, with both pilot gas and fugitive gas directed from the separator 154 to the catalytic heater 158. Solenoid valves can be disposed in the pilot gas line and the fugitive gas line, between the inlet 148 and the pilot gas inlet 170 and the separator 154, to control flow.

In another aspect, the catalytic heater 158 and the panel 162 can be movably and selectively positioned with respect to the separator 154 and the pipe system 158. For example, the panel 162 and the catalytic heater 158 can be positioned closer to the separator 154 and the pipe system 170 in colder climates and seasons, and farther during in warmer climates and seasons.

The FGR system 110 and the skid 122 can have the enclosure 118 surrounding the skid 122 and carried by the skid 122 so that the separator 154, the catalytic heater 158, and the piping system 170 are enclosed in the skid 122. Thus, the heat from the catalytic heater 158 can be maintained in the skid 122 and the enclosure 118 to avoid freeze-up of the pipe system 170 and the separator 154 in colder climates and seasons. The enclosure 118 and the skid 122 can have a vent 142, such as a roof vent, carried by the enclosure 118 to allow air into the enclosure 118 and the skid 122 for combustion by the catalytic heater 158.

The FGR system 110 and the skid 122 can also have a control system coupled to some of the valves, gauges and sensors and selectively controlling the valves to allow vent gas, and/or pilot gas, into the separator 154, and from the separator 154 to the catalytic heater 158.

A method for eliminating casing vent gas from a wellhead, and/or for a lower volume of production gas, and for using the FGR system 110 as described above, can comprise: positioning the enclosure 118 and the skid 122 adjacent to the wellhead; connecting the enclosure 118 and the skid 122 to a valve atop the wellhead to receive the casing vent gas and/or production gas from the wellhead and transport the casing/production gas into the enclosure 118 and the skid 122; removing liquids from the casing/production gas with the separator 154 disposed in the skid 122; and reacting with the casing/production gas in the catalytic heater 158 and heating the enclosure 118 and the skid 122 with heat from the reaction of the casing/production gas.

In addition, supplemental pilot gas can be provided to the catalytic heater 158 as needed. Furthermore, the catalytic heater 158 can be selectively positioned in proximity to the separator 154 and the pipe system 170.

Referring to FIGS. 10-13, another FGR system 210 in accordance with another embodiment is shown, and which is similar in many respects to that described above, and which description is incorporated herein by reference. The following description can apply to the preceding description as well. The enclosure 218 can be elevated above the ground by a plinth 302 and a column 306. The plinth 302 can be positioned over a support surface, such as the ground adjacent a wellhead. The plinth 302 can have a size at least as great as a lateral size of the enclosure 218 to resist tipping. The column 306 can be carried by the plinth 302. The enclosure 218 is carried by the column 306 and elevated over the plinth 302. A lower end of the column 306 can be attached to the plinth 302, while an upper end of the column 306 can be coupled to a bottom of the separator 154.

The enclosure 218 can have a matrix of apertures therein, but still be a substantial enclosure. In one aspect, the enclosure 218 can comprise or can be a clamshell 222 with a pair of portions or shells movably coupled together. In another aspect, the portions or shells can be pivotally coupled together by a hinge 310 and pivotal with respect to one another. One stationary portion or shell can be stationary and secured to the column 306, while the other movable portion or shell can be movable and can pivot with respect to the stationary portion. In addition, the stationary portion or shell can carry and substantially contain the separator 154 and the pipe system 170, while the movable portion or shell can carry and substantially contain the catalytic heater 158. Thus, the catalytic heater 158 can move and pivot with the movable portion or shell with respect to the separator 154 and the pipe system 170.

In one aspect, the separator 154 can be mounted on the column 306, and can form a portion of the column. A bottom of the stationary portion or shell can be coupled to the column 306 under the separator 154, while a top of the stationary portion or shell can be coupled to a top of the separator 154.

As described above, the separator 154 can separate fluid from the casing/production gas, and can contain the removed fluid for later disposal. The separator 154 can have a high fluid shutdown 324 to sense a volume of the separator and stop the flow of gas and shutdown down the operation of the FGR system 310 in the event that the fluid volume exceeds a safe level. The shutdown 324 can comprise a mechanical float located near a top of the separator 154.

The FGR system 210 and the pipe system 170 can comprise a Bradenhead high-pressure regulator 332 coupled to the inlet 146 to receive Bradenhead gas from the fugitive gas source. The high-pressure regulator 332 can have a working pressure of 5.000 psi, and can manage Bradenhead supply and operating pressure of the FGR system 210. In addition, a high-pressure in-line filter 3240 can be coupled to the high-pressure regulator 332. Supply lines, also rated at 5,000 psi, can be coupled to the high-pressure in-line filter 340 and the high-pressure regulator 332.

The FGR system 210 and the pipe system 170 can comprise a low-pressure Bradenhead regulator 348 and a low-pressure pilot gas regulator 352. The low-pressure Bradenhead regulator 348 manages Bradenhead supply pressure and flow to the catalytic heater 158. The low-pressure pilot gas regulator 352 manages pilot gas supply pressure and flow to the catalytic heater 158, and ensures continuous operation of the catalytic heater 158 in the event that Bradenhead gas is insufficient.

As described above, the blow down system/unit 10 can be an initial, larger unit, while the FGR system/unit 110 or 210 can be a subsequent, smaller unit. Thus, the blow down unit 10 can have a larger capacity or volume enclosure 30, a larger capacity or volume separator 58, and/or a larger capacity, volume, surface area or number of catalytic heater(s) 70 or bank 66; while the FGR unit 110 or 210 can have a lower capacity or volume enclosure 118 or 218, a lower capacity or volume separator 154, and/or a lower capacity, volume, surface area or number of catalytic heater(s) 158.

The description of one embodiment can apply to other embodiments as well.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom" "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect." herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of 'substantially' is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

It is to be understood that the examples set forth herein are not limited to the particular structures, process steps, or materials disclosed, but are extended to equivalents thereof as would be recognized by those ordinarily skilled in the relevant arts, it should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A zero emission blow down and fugitive gas remediation system configured to initially blow down accumulated production gas and subsequently eliminate gas at a wellhead, the system comprising:
   a) an initial, larger blow down unit comprising:
      i) a mobile platform with wheels and a tow hitch configured to be initially and removably positioned at the wellhead;
      ii) an enclosure carried by the platform;
      iii) an inlet carried by the platform and configured to be coupled to the wellhead and receive accumulated production gas;
      iv) a separator carried by the platform and located in the enclosure and coupled to the inlet and configured to remove liquid from the accumulated production gas;
      v) a bank of catalytic heaters located in the enclosure and coupled to the separator and configured to react with the accumulated production gas and produce heat; and
   b) a subsequent, smaller fugitive gas remediation unit comprising:
      i) an enclosure configured to be subsequently positioned at the wellhead;
      ii) an inlet carried by the enclosure and configured to be coupled to the wellhead to receive gas;
      iii) a separator located in the enclosure and coupled to the inlet and configured to remove liquid from the gas; and
      iv) a catalytic heater located in the enclosure and coupled to the separator and configured to react with the gas and produce heat in the enclosure; and
   c) the blow down unit having a larger size and a greater gas volume capacity with respect to a smaller size and a lesser gas volume capacity of the fugitive gas remediation unit.

2. The system in accordance with claim 1, wherein the bank of catalytic heaters of the blow down unit further comprises:
   at least two separate banks spaced-apart from one another and with the catalytic heaters of each bank facing one another.

3. The system in accordance with claim 2, further comprising:
   the at least two banks being coupled to the separator in parallel.

4. The system in accordance with claim 1, wherein:
   the platform of the blow down unit has a footprint greater than 100 square feet; and
   the enclosure of the fugitive gas remediation unit has a footprint less than 50 square feet.

5. The system in accordance with claim 1, wherein:
   the catalytic heaters of the blow down unit have a surface area greater than 70 square feet; and
   the catalytic heater of the fugitive gas remediation unit has a surface area less than 9 square feet.

6. The system in accordance with claim 1, wherein a capacity of the blow down unit is an order of magnitude greater than a capacity of the fugitive gas remediation unit.

7. A method of blowing down and remediating a well utilizing the system in accordance with claim 1, the method comprising:
   positioning the blow down unit at the wellhead and coupling the inlet of the blow down unit to the wellhead;
   receiving accumulated production gas from the wellhead and reacting the accumulated production gas with the bank of catalytic heaters of the blow down unit;
   servicing the well;
   removing the blow down unit;
   positioning the fugitive gas remediation unit at the wellhead and coupling the inlet of the fugitive gas remediation unit to the wellhead; and
   receiving fugitive casing gas, or production gas, or both from the wellhead and reacting the fugitive casing gas, or production gas, or both with the catalytic heater of the fugitive gas remediation unit.

8. A zero emission blow down system configured to blow down a well, the system comprising:
   a) a mobile platform with wheels and a tow hitch configured to be removably positioned at a wellhead;
   b) an enclosure carried by the platform;
   c) an inlet carried by the platform and configured to be coupled to the wellhead and receive accumulated production gas;
   d) a separator carried by the platform and located in the enclosure and coupled to the inlet and configured to remove liquid from the accumulated production gas;
   e) a bank of catalytic heaters located in the enclosure and coupled to the separator and configured to react with the accumulated production gas and produce heat in the enclosure;
   f) the catalytic heaters are positioned closer to the tow hitch of the platform; and
   g) the separator is positioned farther from the tow hitch of the platform.

9. The system in accordance with claim 8, wherein the bank of catalytic heaters further comprises:
   at least two separate banks spaced-apart from one another and with the catalytic heaters of each bank facing one another.

10. The system in accordance with claim 9, further comprising:
    the at least two banks being coupled to the separator in parallel;
    each bank comprising at least two stacks of catalytic heaters arranged in a column; and
    the at least two stacks being coupled in parallel.

11. The system in accordance with claim 9, further comprising:
    the at least two banks being oriented parallel with one another;
    the at least two banks being positioned spaced-apart from one another; and
    the at least two banks being positioned spaced-apart from lateral walls of the enclosure.

12. The system in accordance with claim 8, wherein:
    the bank of catalytic heaters is oriented parallel with a length of the platform; and
    the catalytic heaters are oriented parallel with the length of the platform and face laterally.

13. The system in accordance with claim 8, wherein:
the platform has a footprint greater than 100 square feet.

14. The system in accordance with claim 8, wherein:
the bank of catalytic heaters extends at least half of a length of the enclosure.

15. The system in accordance with claim 8, wherein:
the bank of catalytic heaters extends from a floor to a ceiling of the enclosure.

16. The system in accordance with claim 8, further comprising:
the bank of catalytic heaters is anchored to a wall of the enclosure; and
a stand-off coupled between the bank of catalytic heaters and the wall of the enclosure with the catalytic heaters spaced-apart from lateral walls of the enclosure.

17. The system in accordance with claim 8, further comprising:
the mobile platform, the enclosure, the inlet, the separator, and the bank of catalytic heaters being part of an initial, larger blow down unit;
a subsequent, smaller fugitive gas remediation unit comprising:
   i) an enclosure configured to be subsequently positioned at the wellhead;
   ii) an inlet carried by the enclosure and configured to be coupled to the wellhead to receive gas;
   iii) a separator located in the enclosure and coupled to the inlet and configured to remove liquid from the gas; and
   iv) a catalytic heater located in the enclosure and coupled to the separator and configured to react with the gas and produce heat in the enclosure; and
the blow down unit having a larger size and a greater gas volume capacity with respect to a smaller size and a lesser gas volume capacity of the fugitive gas remediation unit.

18. A method of blowing down and remediating a well utilizing the system in accordance with claim 17, the method comprising:
positioning the blow down unit at the wellhead and coupling the inlet of the blow down unit to the wellhead;
receiving accumulated production gas from the wellhead and reacting the accumulated production gas with the bank of catalytic heaters of the blow down unit;
servicing the well;
removing the blow down unit;
positioning the fugitive gas remediation unit at the wellhead and coupling the inlet of the fugitive gas remediation unit to the wellhead; and
receiving fugitive casing gas, or production gas, or both from the wellhead and reacting the fugitive casing gas, or production gas, or both with the catalytic heater of the fugitive gas remediation unit.

19. A zero emission blow down system configured to blow down a well, the system comprising:
a) a mobile platform with wheels and a tow hitch configured to be removably positioned at a wellhead;
b) an enclosure carried by the platform;
c) an inlet carried by the platform and configured to be coupled to the wellhead and receive accumulated production gas;
d) a separator carried by the platform and located in the enclosure and coupled to the inlet and configured to remove liquid from the accumulated production gas; and
e) a bank of catalytic heaters located in the enclosure and coupled to the separator and configured to react with the accumulated production gas and produce heat in the enclosure, wherein the bank of catalytic heaters further comprises:
   at least two separate banks spaced-apart from one another and with the catalytic heaters of each bank facing one another;
   the at least two banks being coupled to the separator in parallel;
   the at least two banks being positioned spaced-apart from one another;
   the at least two banks being positioned spaced-apart from lateral walls of the enclosure;
   the at least two banks being anchored to walls of the enclosure; and
   stand-offs coupled between the at least two banks and the walls of the enclosure.

* * * * *